United States Patent
Zhu

[19]

[11] Patent Number: 5,956,212
[45] Date of Patent: Sep. 21, 1999

[54] STATIC ATTITUDE ADJUSTMENT OF A TRACE-SUSPENSION ASSEMBLY

[75] Inventor: Li-Yan Zhu, San Jose, Calif.

[73] Assignee: Headway Technologies, Inc., Milpitas, Calif.

[21] Appl. No.: 08/998,632

[22] Filed: Dec. 29, 1997

[51] Int. Cl.[6] .................................................. G11B 5/48
[52] U.S. Cl. ............................................................ 360/104
[58] Field of Search ....................................... 360/104, 103

[56] References Cited

U.S. PATENT DOCUMENTS

| | | | |
|---|---|---|---|
| 5,237,475 | 8/1993 | Kazama et al. | 360/104 |
| 5,282,103 | 1/1994 | Hatch et al. | 360/104 |
| 5,321,568 | 6/1994 | Hatam-Tabrizi | 360/104 |
| 5,490,027 | 2/1996 | Hamilton et al. | 360/104 |
| 5,528,819 | 6/1996 | McKay et al. | 360/103 X |
| 5,594,607 | 1/1997 | Erpelding et al. | 360/104 |
| 5,608,590 | 3/1997 | Ziegler et al. | 360/104 |
| 5,636,089 | 6/1997 | Jurgenson et al. | 360/104 |
| 5,708,541 | 1/1998 | Erpelding | 360/104 |
| 5,754,369 | 5/1998 | Balakrishnan | 360/104 |
| 5,771,135 | 6/1998 | Ruiz et al. | 360/104 |

*Primary Examiner*—John H. Wolff
*Attorney, Agent, or Firm*—George O. Saile; Stephen B. Ackerman

[57] ABSTRACT

A trace suspension assembly for supporting a smaller head slider from an actuator arm in a disk drive includes a flexure formed in three layers, a stainless steel layer for mechanical strength, a polyimide layer for electrical isolation and a ductile copper layer for electrical transmission. The copper layer is etched to form a plurality of U-shaped and contiguous circuit traces beginning at the distal end of the flexure and running symmetrical along each side of the flexure to its proximal end. Indentation sites along the copper traces adjusts for pitch static attitude and/or roll static attitude errors.

13 Claims, 4 Drawing Sheets

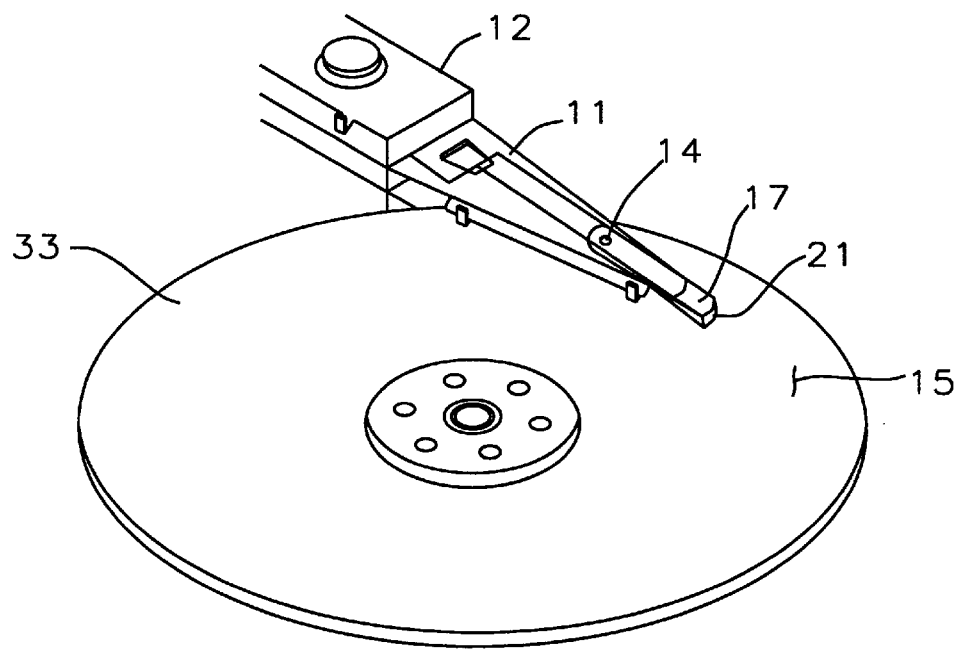
*FIG. 1 - Prior Art*
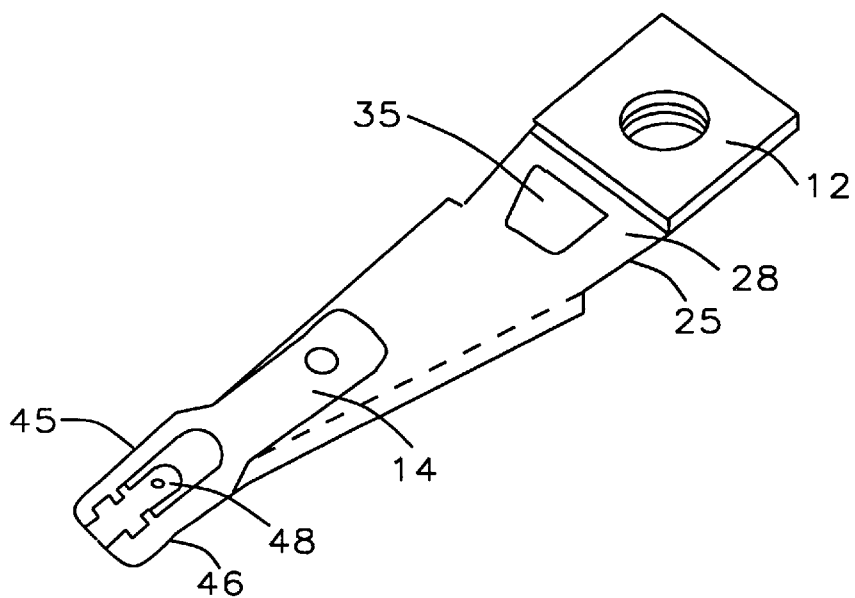
*FIG. 2 - Prior Art*

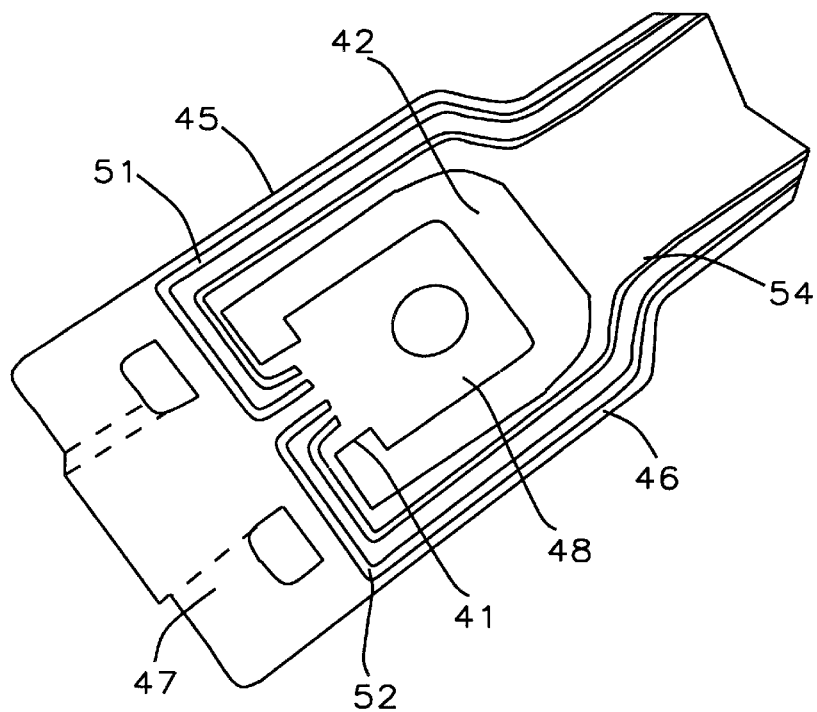
FIG. 3A – Prior Art
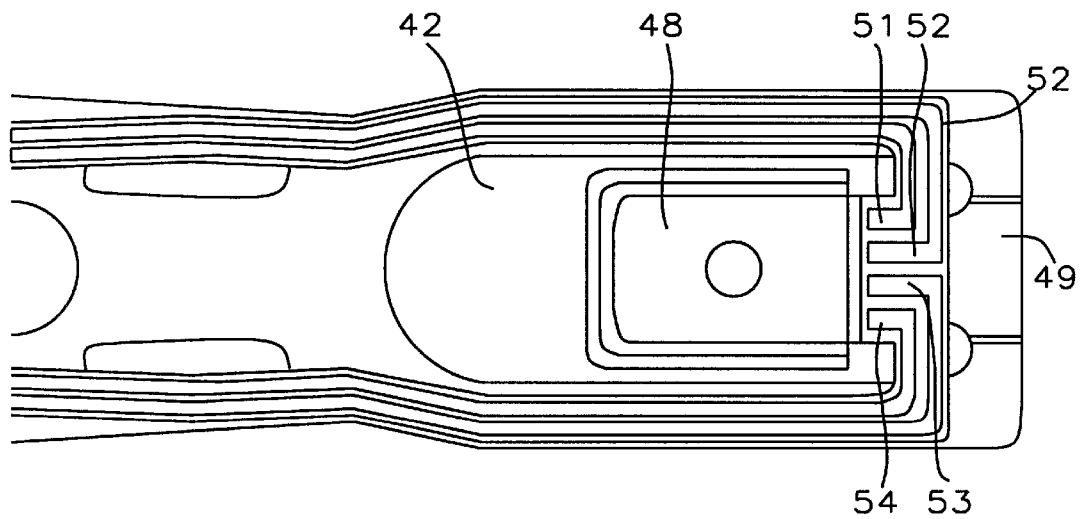
FIG. 3B – Prior Art

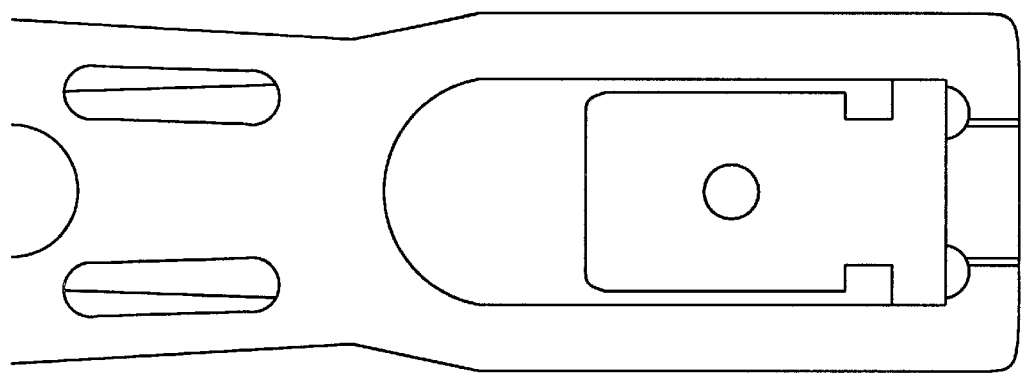
FIG. 3C – Prior Art
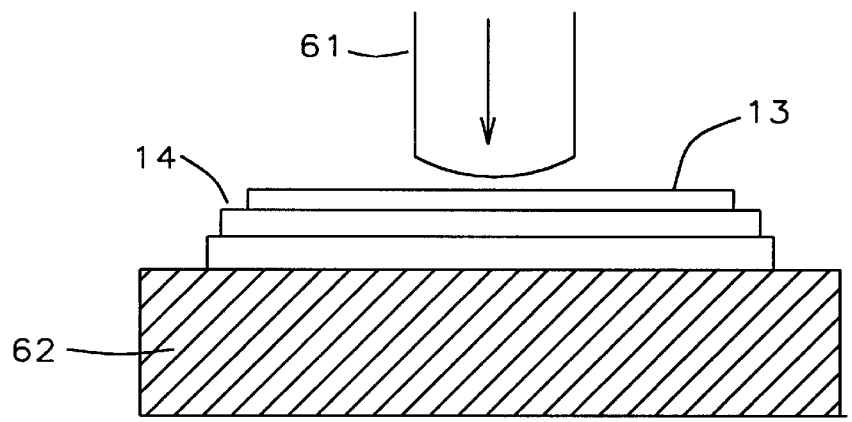
FIG. 4
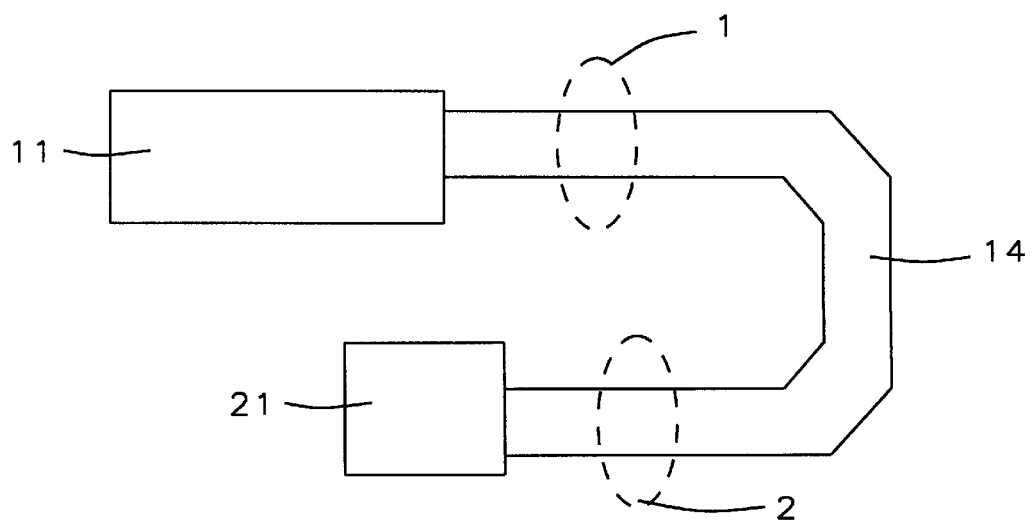
FIG. 5

STATIC ATTITUDE ADJUSTMENT OF A TRACE-SUSPENSION ASSEMBLY

BACKGROUND OF THE INVENTION (1) Technical Field

This invention relates to the field of disk drives, in particular, to a trace suspension assembly that accommodates the smaller, magnetoresistive heads and their flying attitude with respect to the surface of a rotating disk.

(2) Description of the Prior Art

The following five patents relate to methods dealing with static attitude compensation of head suspension assemblies.

U.S. Pat. No. 5,636,089 issued Jun. 3, 1997 to Ryan A. Jurgenson et al, discloses a method and apparatus to reduce or eliminate static pitch offset error and static roll offset error by adding a dimple to a configured flexure tongue. The dimple is spaced longitudinally along the axis of a head suspension assembly from a static offset error correction protuberance, which is used for engaging and applying a load to a head slider mounted on the flexure tongue.

U.S. Pat. No. 5,608,590 issued Mar. 4, 1997 to David A Ziegler et al, discloses a gimbal flexure with static compensation and load point integral etched features.

U.S. Pat. No. 5,321,568 issued Jun. 14, 1994 to Shahab Hatam-Tabrizi, discloses a method and apparatus to improve pitch and roll characteristics by incorporating a bump or dimple disposed to contact both the top surface of the slider and the load beam so that, in effect, the slider is continuously pressed against the contact point formed by the dimple. Additionally, an elastomeric material is applied between the load beam and flexure to prevent the slider from sliding to an off-track position while damping any mechanical resonances on the head suspension assembly.

U.S. Pat. No. 5,282,103 issued Jan. 25, 1994 to Michael R. Hatch et al, discloses a magnetic head suspension assembly fabricated with an integral load beam and flexure.

U.S. Pat. No. 5,237,475 issued Aug. 17, 1993 to Toshio Kazama et al, discloses a magnetic head suspension assembly, with an adapter, for photo-magnetic recording.

In a hard disk drive, a head slider is positioned by a head suspension assembly (HSA) over a magnetic disk to facilitate reading and writing of information to the disk. Across the spectrum from network servers to personal computers and desktop workstations to notebook systems, the capacity demands placed on hard disk drives are increasing faster than ever before. Because lower costs per megabyte are also disired, the conventional method of adding disks and heads is less and less appropriate. Instead, the primary engineering challange is to continue increasing areal densities, or bits of data per square inch of disk surface.

To date, drive manufacturers have successfully doubled capacities every 12 to 18 months by increasing areal density. Pushing areal densities higher results in smaller recorded patterns on the disk, hence, weaker signals generated by the read head. The consensus then, leads to a major transition in head technology in order to continue the swift pace of areal density improvements seen today. This transition [from inductive head technology, used since the first disk drive was introduced to the new, magnetoresistive head technology (MR)] is necessary if magnetic random access storage is to remain the storage medium of choice over the course of the next decade. Laboratory tests have demonstrated that MR heads can deliver four times the areal densities possible with thin film inductive heads. MR technology allows continued reductions in the cost of stored data and has several advantages over thin film inductive heads, including separate read and write elements, high signal output, low noise and velocity independent output. However, a MR head has more leads than an inductive head.

The constituent elements of standard HSAs include a swage plate, a resilient zone, a load beam, a flexure and a head slider having a top, bottom and side surfaces. Along the far side surface, a thin film transducer is attached to the head slider so that information can be written and read from the rotating magnetic disk. The swage plate is positioned at a proximal end of the load beam, adjacent to the resilient zone and is mounted to the suspension by means of a boss and by laser welding. The swage plate provides stiffness to the rear mount section and is configured for mounting the load beam to an actuator arm of a disk drive. The flexure is positioned at a distal end of the load beam. Mounted to the flexure is a head slider with a read/write orientation with respect to an associated disk.

As the track density of hard disk drives increase, more and more attention must be paid to the design of the suspension spring, since its static attitudes and other dynamic factors limit the track density that can be achieved. In recent years, the trend in suspension design has been toward smaller suspensions and much research and development work is going on in the areas of suspension design, integration of electrical wires from the head on the suspension, and optimization of suspension design to reduce sway modes and undesirable suspension resonances.

Preload, also known as gram load, and static attitudes are crucial parameters to all suspensions used in a disk drive. More importantly, static attitudes are especially critical as the slider becomes smaller as they impart a moment on the slider. The moment must be balanced by an air bearing lift force. As the slider gets smaller, the lever arm also gets smaller, hence, the reacting lift forces becomes greater. Consequently, the effect of static attitudes on the slider's flying attitude becomes greater.

The smaller, trace suspension assembly(TSA), is extremely sensitive to static attitude excursions. The TSA is wireless. Electrical connection is made by attaching gold balls between the slider and suspension. This process causes unwanted and unpredicable change in the static attitudes, by two distinct mechanisms. First, the slider must be held firmly for the gold ball bond. During the bonding process, the holding fixture makes contact with the thin suspension and flexure causing deformation. Secondly, the trace deforms when the gold balls are ultrasonically bonded. Studies have shown that pitch static attitude greatly influences slider fly height variation.

Previously, preload adjustment was done on the suspension instead of the flexure, and performed prior to its static attitude adjustment. Preload adjustment was done by wrapping the suspension around a mandrel while heating the resilient zone of the load beam using an infra-red lamp. Only recently have tools for static attitude adjustment been made available. Pitch static adjustment is done by bending the resilient zone.

As pertaining to a TSA, roll static attitude is coincident with the longitudinal axis of the TSA. The value of roll-static attitude is measured, often optically, when the suspension is lifted so that the plane of the flexure tongue is in a predetermined height differential with respect to the plane of the swage plate. If the flexure is bent, the values measured on either side will not be the same. Thus, when the attached trace head is in a flying attitude to the associated disk surface, an effected force is needed to twist the tongue back into a planar parallel alignment to the disk.

Pitch static attitude has its axis perpendicular to the longitudinal axis of the TSA, and thus to the roll axis. The value of the pitch static attitude is measured often optically, when the suspension is lifted against preload, such that the plane of the flexure tongue is a predetermined height differential with respect to the plane of the swage plate. If the flexure is bent, the values measured on either side will not be the same. Thus, when the attached trace head is in a flying attitude to the associated disk surface, an effected force is needed to twist the tongue back into a planar parallel alignment to the disk. It will of course be understood that under actual conditions, the flexure may need to be effectively twisted with respect to both axis, to achieve alignment about both the pitch and roll axis.

These pitch and roll conditions can also be referred to in terms of static attitude at the flexure/slider interface and, in terms of the pitch and roll stiffness of the flexure. In an actual disk drive, pitch and roll attitude produce unfavorable forces between the air bearing surface of the trace head and disk, affecting the flying height of the trace head above the disk, resulting in deviations from optimum head/disk interface separation.

The disk drive industry has been trying to reduce static attitude errors for years by reverse bending of its load beam. This is undesirable because the deviation often arises from the flexure. Compensating one deviation with another can cause side effects such as altered suspension-to-disk clearance and change in the vibration modes. The present invention adjusts the static attitude by deforming the flexure, thus preserving the load beam profile.

SUMMARY OF THE INVENTION

It is an object of the invention to provide a trace suspension assembly for which measured errors in pitch static attitude and roll static attitude may be easilly adjusted by indenting specific sites located in specific areas of its flexure member.

It is another object of the invention to provide a method for correcting pitch attitude errors resulting from tolerance buildup during forming and assembling of the individual elements which make up the trace suspension assembly.

It is another object of the invention to provide a method for correcting roll attitude errors resulting from tolerance buildup during forming and assembling of the individual elements which make up the trace suspension assembly.

It is still another object of the invention to provide a process that affords significant savings and advantages in manufacture and mass production.

The foregoing objects of the invention are accomplished and the disadvantages of the prior art overcome by a procedure that teaches how to correct static-attitude error.

A TSA flexure consists of three layers; a stainless steel layer for mechanical strength, a polyimide layer for electrical insulation, and a copper layer for electrical transmission. According to this invention, cold-working of the copper layer can be achieved simply by indentation. The magnitude of static attitude adjustment can be controlled by the depth of indentation and by the number of indentations along the trace. The copper traces form a U-turn on the flexure, thus indentation is able to adjust for pitch static attitude in both positive and negative directions. The polarity can be controlled by selecting the indentation sites. Indentation on the flexure legs causes an increase in pitch static attitude, and indentation on the tongue causes a decrease in pitch static attitude. The copper traces are located on both legs of the flexure, therefore, any single indentation is off the axis of symmetry hence, causing a net change in roll static attitude. The control of roll static attitude is achieved by selecting the location of the indentation.

During the set-up procedure, the indentation sites must be identified. For each indentation site, sensitivity for both pitch and roll attitude must be obtained.

Prior to applying this corrective procedure, measure the desired amount of static attitude adjustments, for both pitch and roll and then select the indentation sites and the magnitude of applied indentation to minimize the measured static attitude.

BRIEF DESCRIPTION OF THE DRAWINGS

FIG. 1 is a perspective view of a trace suspension assembly, of the prior art, for positioning a smaller head slider above the surface of a rotating magnetic disk.

FIG. 2 is a perspective view of a load beam and an attached flexure of the prior art.

FIG. 3 is an enlarged illustration of a distal portion of a flexure of the prior art.

FIG. 3a is an enlarged illustration of a top view of a distal portion of a flexure, of the prior art, shown with copper traces.

FIG. 3b is an enlarged illustration of a top view of a distal portion of a flexure, of the prior art, shown without copper traces.

FIG.4 illustrates a front view of an indentation tool, of the invention.

FIG. 5 is a top view, of the invention, of a hypothetical and symbolic flexure showing a U-turn.

DETAILED DESCRIPTION OF THE PREFERRED EMBODIMENT

Figure 6:
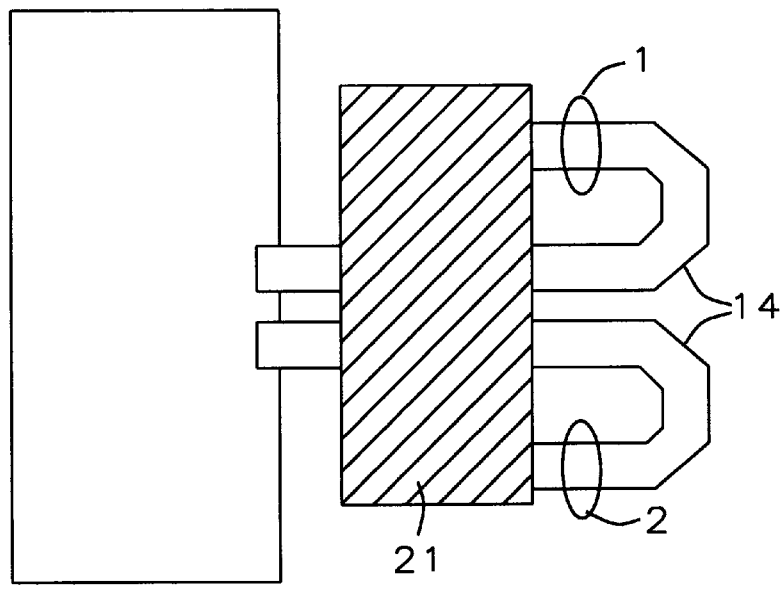
FIG. 6 illustrates the invention and how adjustments in static pitch and roll attitude can be achieved with indentation.

A trace suspension assembly with improved static attitude attributes is described. With reference to FIG.1, there is illustrated a perspective view of a conventional TSA comprising a slider 21 with a trace head 17 attached to the slider so that information can be written to and read from the rotating disk 15, over which the slider flies. Observe that the top surface of the slider body is attached to a flexure element 14 which typically comprises three layers, a stainless steel layer for mechanical strength, a polyimide layer for electrical insulation, and a copper layer for electrical transmission. More often, flexure 14 includes various shaped slots which increases its flexibility allowing the slider to pitch and roll over height variations present on the surface of the disk. Flexure 14 is shown attached to load beam 11 which is mounted to the actuator arm via swage plate 12.

Referring now to FIG. 2, a load beam 11 is formed from a single sheet of stainless steel and includes a swage plate 12, a flexible zone 28. The leaf spring 25 between the load beam section 11 and swage plate 12 is often formed with a trapezoidal-like cutout to provide flexiblity. The flexible zone 28 is formed to provide a desired load force that counteracts the aerodynamic lift force generated by the rotating disk during operation of the disk drive.

The flexure 14 is located and fixed at a distal end of load beam 11 and is made up of three layers, a stainless steel layer for mechanical strength, a polyimide layer for electrical insulation and a ductile copper layer for electrical transmission. Referring to FIGS. 3, 3a, and 3b showing the distal end of flexure 14 having a flexure section 41 which is formed between two spaced legs defining a cutout portion 42 therebetween. Legs 45, 46 have a lateral member 47 spaced and connecting legs 45, 46.

The tongue 48 resiliently extends from lateral member 47 and is disposed between legs 45, 46 with its free end within the flexure cutout 42.

A plurality of contiguous running circuit traces 51 thru 54 are formed in the ductile copper layer of flexure 14. The circuit traces begin at the base of tongue 48 forming a U-shaped turn and run symmetrically along each of the two spaced legs 45, 46 towards the proximal end of the flexure.

The trace slider 21 is mounted to the flexure tongue so that the plane of the air bearing surface of the trace slider is at a planar and parallel relationship to the plane of the disk surface. During production and assembly of the TSA, all errors in precision during forming and placement of the individual elements will contribute to a lack of planarity in the critical surfaces of the elements. The buildup of tolerances will effect departure from the desired planar relationships to the associated disk surface in the final TSA. The parameters of pitch static attitude (PSA) and roll static attitude (RSA) in the final TSA result from these production and assembly tolerance buildups.

Ideally, for optimum operation of the disk drive, during assembly of the trace slider to the flexure tongue, the plane of the load beam mounting surface datum (to which the load beam is mounted during the assembly of the TSA)and the plane of the trace slider air bearing surface datum are surfaces used as reference in establishing the planar parallelism of the TSA.

Because the TSA flexure comprises three layers, and given the same bend radius, the strain increases proportionally with distance from the neutral axis. In a conventional flexure, the single layer is very thin. Thus the strain is very small. The stainless steel can withstand a large strain before any permanent setting occurs. Therefore, a conventional flexure can fully recover from severe bending. As example, when the slider is wiped with a cotton swab, a conventional flexure may be bent over 5° without permanent change of static attitudes.

Since a TSA flexure is considerably thicker, the outer layers experience much more strain than in a conventional flexure. Furthermore, the top copper layer has a lower elastic limit than stainless steel, hence, is more susceptible to damage, as from cotton swabs. However, this shortcoming can be advantageous.

The key aspect of the invention is to intentionally deform the copper layer as illustrated in FIG. 4. Shown is a flexure 14 supported by support block 62. An indenting punch 61 is used to form convex shaped depressions in the top copper layer 13. Because the copper layer is far from the neutral axis, a high degree of precision can be achieved in bending. Copper is very malleable, hence, indentation involves minimal stress. It will not propagate into the stainless steel causing damage. Indentation causes the free end of the flexure to displace upward. A careful examination of this mechanism reveals both pitch and roll can be adjusted in both directions. To clarify this, consider a hypothetical flexure comprising a U-turn as illustrated in FIG. 5. Flexure 14 is held firmly at one end of a suspension 11, and attached at the other end to a slider 21 with the copper layer facing up. When site 1 is deformed with an indenting tool, the flexure 14 concaves up, the slider 21 rotates downward. When site 2 is deformed, the flexure 14 still rotates upward, as well as slider 21. This principle, therefore, demonstrates the slider pitch static attitude can be adjusted in both direction, up and down, depending on the site of indentation.

Figure 7:
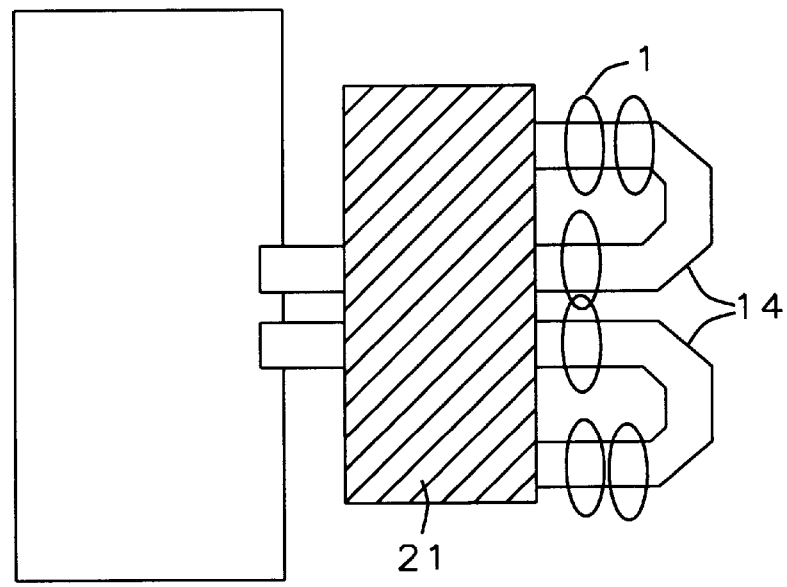
FIG. 7 illustrates potential multiple indentation sites, of the invention, for correcting measured pitch static attitude errors.

In FIG. 6, a slider 21 is connected to the suspension 11 through flexure 14 on both sides. When a pitch adjustment is made by equal indentation(s) in sites 1 and 2, no change in static roll will be observed. If pitch adjustment is made by indentation at site 1 only, the roll will be altered. Alternately, the roll will change in the opposite direction if site 2 alone is indented. This method provides the means to alter pitch and roll in any direction. The magnitude of pitch and/or roll change corresponds to the force of indentation, the number of repetition, and the number of sites indented. Any combination of static attitude changes can be made by indentation at appropriate sites. In practice, more than four sites are available for indentation. An example is shown in FIG. 7 which depicts an inductive head with only two traces and six sites 2. In reality, most TSAs will be made for magnetoresistive (MR) heads where there are four or five traces per head gimble assembly (HGA). Thus the total number of sites available is quite large, often between six and fifteen. The solution for any desired attitude change is almost always existent and routine, leaving much latitude for optimization.

There are several levels of sophistication in the adjustment of a HGA. The simplest is to adjust each traditional parameter, preload, PSA, and RSA, to its nominal value. This approach is ineffective, because the effect of PSA and RSA on slider flying attitude is statically equivalent to a moment related with the slider mounting position. In the production of HGA, there is often appreciable deviation on the slider mounting position. Therefore the optimal value of PSA and RSA is often different form their respective nominal value.

A more appropriate method is to adjust the load distribution, which comprises, the magnitude of preload, load distribution in the roll direction, and load distribution in the pitch direction. At this level, the novel method appears inadequate, since indentation of the flexure does not alter the preload. However, this method can be used in conjunction with the traditional way of bending the suspension. While this novel indentation method adjusts PSA and RSA, traditional method adjusts the preload. This methodology is now adequate, though not efficient.

In the third level of sophistication, note that the fly-height at the read/write head is far more important than the pitch angle of a flying slider. The read/write head fly-height is affected by both the preload and the PSA. Thus a deviation of preload can be compensated by an appropriate deviation of PSA. The optimal amount of compensation depends on the radial position of the slider on the disk. Since the slider operates over a finite range of radius, the compensation will not be perfect in all radii. However, a compromise can be reached such that the deviation of read/write head fly-height is acceptable in all radii.

In the fourth level of sophistication, note that the read/write head fly-height is affected by many parameters not related to HGA geometry or load distribution. For example, in the slider fabrication, slider crown, camber, twist, taper length, taper angle, rail width, cavity depth, mask alignment, and slider length are all subject to manufacturing tolerance. Furthermore, these parameters exhibit both "within the batch", and "batch-to-batch" scatter.

To compensate for the deviation of above parameters, it is necessary to perform a fly-height test. Based on the cost consideration, sampling is often preferred over screen. Obviously, the effectiveness of fly-height adjustment increases with the sampling rate. At this fourth level of sophistication, the RSA is not simply adjusted to offset deviations of the RSA and slider mounting position, but all parameters, measurable or not, on the slider flying roll attitude. Similarly, the PSA is not simply adjusted to offset deviations in preload and PSA, but to offset deviations in all parameters, measurable or not, on the read/write head fly-height.

While the invention has been particularly shown and described with reference to the preferred embodiments thereof, it will be understood by those skilled in the art that various changes in form and details may be made without departing from the spirit and scope of the invention.

What is claimed is:

1. A trace suspension assembly for supporting a recording head at an adjusted flying attitude with respect to a recording surface of a rotatable data storage medium, the trace suspension assembly comprising an elongated load beam embodying a spring structure;
   a swage plate on a first end of said load beam, for mounting to a disk drive actuator arm;
   a proximal end of a flexure mounted at a second end of said load beam, said flexure comprising three layers;
   a stainless steel layer for mechanical strength;
   a polyimide layer for electrical isolation; and
   a ductile copper layer for electric transmission:
   said flexure further comprising a flexible section between two spaced legs defining a cutout portion therebetween, said legs extending towards a distal end of said flexure, said legs having a lateral member spaced and connecting said legs;
   a tongue resiliently extending from said lateral member, said tongue being disposed between legs of said flexible section, said tongue having a free end within said flexible section, said tongue further comprising:
   a plurality of U-shaped and contiguous circuit traces etched in said ductile copper layer, said contiguous circuit traces starting at base of tongue making a U-turn and extending symmetrically along each of the two spaced legs towards the proximal end of said flexible section; and
   a slider engaging surface configured for bonding to said free end of said tongue.

2. The trace suspension assembly according to claim 1 wherein indentation on the copper traces located on said flexure legs causes an increase in pitch static attitude.

3. The trace suspension assembly according to claim 1 wherein indentation on the copper traces located on said tongue causes a decrease in pitch static attitude.

4. The trace suspension assembly according to claim 1 wherein a single indentation on one of said legs of said flexible section adjusts for roll static attitude.

5. The trace suspension assembly according to claim 1 wherein a single indentation on one of said legs of said flexible section is off the axis of symmetry thereby a net change in roll static attitude is determined by selecting one of the two legs to be indented.

6. A method for reducing static attitude errors by mechanical indentation of ductile copper traces in a trace suspension assembly comprising the steps of:
   providing a trace suspension assembly having;
   an elongated load beam embodying a spring structure;
   a swage plate on a proximal end of the load beam for mounting to a disk drive actuator arm;
   a flexure mounted at its proximal end to a second end of said load beam, said flexure comprising three layers
   a stainless steel layer for mechanical strength;
   a polyimide layer for electrical isolation; and
   a ductile copper layer for electric transmission:
   said flexure further comprising a flexible section formed between two spaced legs defining a cutout portion therebetween, said legs extending towards a distal end of said flexure, said legs having a lateral member spaced and connecting said legs;
   a tongue resiliently extending from said lateral member, said tongue being disposed between legs of said flexible section, said tongue having a free end within said flexible section, said tongue further comprising:
   a plurality of U-shaped and contiguous circuit traces etched in said ductile copper layer, said contiguous circuit traces starting at base of tongue making a U-turn and extending symmetrically along each of the two spaced legs towards the proximal end of said flexure;and
   a slider engaging surface configured for bonding to said free end of said tongue;
   establishing locations of indentation sites on both legs of said flexible section and tongue, said indentation sites to be used for indenting said ductile copper layer for reducing measured static attitude errors;
   obtaining sensitivity of pitch static attitude and roll static attitude to indentation at each site;
   identifying sensitivity of pitch static attitude and roll static attitude to indentation at one or more levels of indentation force;
   measuring amount of static attitude pitch error and static attitude roll error; and
   establishing, using numerical optimization methods, indentation site(s) and magnitude of indentation that minimizes residual static attitude.

7. The method of claim 6 wherein indentation is capable of pitch static attitude adjustment in both positive and negative directions.

8. The method of claim 6 wherein indentation on the legs of said flexible section causes an increase in pitch static attitude.

9. The method of claim 6 wherein indentation on the tongue of said flexible section causes a decrease in pitch static attitude.

10. The method of claim 6 wherein a single indentation on one of said legs of said flexible section adjusts for roll static attitude.

11. The method of claim 6 wherein a single indentation on one of said legs of said flexible section is off the axis of symmetry thereby a net change in roll static attitude is determined by selecting one of the two legs to be indented.

12. The method of claim 6 wherein adjusting the load distribution so that the projected slider flying attitudes are closest to the target values.

13. The method of claim 6 whereby adjusting static attitude at the flexure is cost effective.

* * * * *